US009376578B2

(12) United States Patent
Bourdette et al.

(10) Patent No.: US 9,376,578 B2
(45) Date of Patent: Jun. 28, 2016

(54) STRIPPING COMPOSITION

(75) Inventors: Arnaud Bourdette, Chelles (FR);
Jean-Emile Zanetto, Lyons (FR);
Patrick Lasnet De Lanty,
Fontenay-aux-Roses (FR)

(73) Assignee: RHODIA OPERATIONS, Aubervilliers (FR)

( * ) Notice: Subject to any disclaimer, the term of this patent is extended or adjusted under 35 U.S.C. 154(b) by 85 days.

(21) Appl. No.: 13/146,175

(22) PCT Filed: Jan. 21, 2010

(86) PCT No.: PCT/EP2010/050696
§ 371 (c)(1),
(2), (4) Date: Nov. 10, 2011

(87) PCT Pub. No.: WO2010/084159
PCT Pub. Date: Jul. 29, 2010

(65) Prior Publication Data
US 2012/0046212 A1 Feb. 23, 2012

(30) Foreign Application Priority Data
Jan. 23, 2009 (FR) ...................... 09 00296

(51) Int. Cl.
*C11D 1/02* (2006.01)
*C11D 1/72* (2006.01)
*C11D 3/20* (2006.01)
*C11D 3/43* (2006.01)
*C09D 9/04* (2006.01)
*C11D 1/66* (2006.01)
*C11D 1/825* (2006.01)
*C11D 3/34* (2006.01)

(52) U.S. Cl.
CPC .. *C09D 9/04* (2013.01); *C11D 1/02* (2013.01);
*C11D 1/66* (2013.01); *C11D 1/667* (2013.01);
*C11D 1/72* (2013.01); *C11D 1/825* (2013.01);
*C11D 3/201* (2013.01); *C11D 3/2003*
(2013.01); *C11D 3/2068* (2013.01); *C11D 3/2072* (2013.01); *C11D 3/2093* (2013.01);
*C11D 3/3445* (2013.01)

(58) Field of Classification Search
CPC ............ C11D 1/66; C11D 1/667; C11D 1/72;
C11D 1/825; C11D 1/02; C11D 3/2003;
C11D 3/201; C11D 3/2068; C11D 3/2072;
C11D 3/2093; C11D 3/3445; B08B 3/04
USPC ......... 510/201, 202, 208, 212, 245, 254, 421;
510/422, 436, 466, 499, 493, 505, 506;
134/38, 39, 40
See application file for complete search history.

(56) References Cited

U.S. PATENT DOCUMENTS

| 4,673,524 | A | * | 6/1987 | Dean | 510/413 |
|4,780,235|A||10/1988|Jackson||
|4,934,391|A|*|6/1990|Futch et al.|134/40|
|5,049,314|A|*|9/1991|Short|510/212|
|5,096,501|A||3/1992|Dishart et al.||
|5,427,710|A|*|6/1995|Stevens|134/1|
|5,712,237|A|*|1/1998|Stevens|510/291|
|5,863,881|A|*|1/1999|Vlasblom|510/365|
|5,877,133|A|*|3/1999|Good|510/175|
|5,891,835|A|*|4/1999|Vlasblom|510/143|
|5,916,860|A||6/1999|Joye et al.||
|5,932,530|A||8/1999|Radu et al.||
|2002/0013241|A1||1/2002|Lallier et al.||
|2002/0032138|A1||3/2002|Lallier||
|2003/0054972|A1|*|3/2003|Joye et al.|510/506|
|2004/0121932|A1|*|6/2004|Griese et al.|510/417|
|2005/0096245|A1|*|5/2005|Hei et al.|510/383|
|2006/0058208|A1|*|3/2006|Ventura et al.|510/201|
|2006/0089281|A1|*|4/2006|Gibson|510/201|
|2007/0027050|A1|*|2/2007|Crotty et al.|510/130|
|2007/0093404|A1|*|4/2007|Gross et al.|510/407|
|2008/0081778|A1||4/2008|Decket||
|2008/0234164|A1|*|9/2008|Tyborski|510/254|
|2008/0255023|A1|*|10/2008|Shimmin et al.|510/470|
|2009/0224204|A1||9/2009|Marion et al.||
|2009/0281012|A1|*|11/2009|Trivedi et al.|510/138|
|2009/0326260|A1||12/2009|Leconte et al.||
|2009/0326261|A1||12/2009|Leconte et al.||
|2010/0145091|A1||6/2010|Buisine et al.||
|2010/0240564|A1|*|9/2010|Zanetto et al.|510/202|
|2010/0273695|A1|*|10/2010|Sehgal et al.|510/174|

FOREIGN PATENT DOCUMENTS

| DE | 34 38 399 C1 | 3/1986 |
|---|---|---|
| EP | 0 294 041 A2 | 12/1988 |
| EP | 0 389 829 A1 | 10/1990 |
| EP | 0 474 053 A1 | 3/1992 |
| EP | 1 038 928 A1 | 9/2000 |
| EP | 1 160 297 A1 | 12/2001 |
| FR | 2 732 034 A1 | 9/1996 |
| WO | WO 90/08206 | 7/1990 |
| WO | WO 95/27757 A1 | 10/1995 |
| WO | WO 2006/030006 A1 | 3/2006 |
| WO | WO 2007/101929 A1 | 9/2007 |
| WO | WO 2007/141404 A1 | 12/2007 |
| WO | WO 2008/009792 A1 | 1/2008 |
| WO | WO 2008/043807 A1 | 4/2008 |
| WO | WO 2008/062058 A1 | 5/2008 |

OTHER PUBLICATIONS

International Search Report (PCT/ISA/210) issued on Mar. 11, 2011, by European Patent Office as the International Searching Authority for International Application No. PCT/EP2010/050696.
Written Opinion (PCT/ISA/237) issued on Mar. 11, 2011, by European Patent Office as the International Searching Authority for International Application No. PCT/EP2010/050696.

* cited by examiner

*Primary Examiner* — Gregory R Delcotto
(74) *Attorney, Agent, or Firm* — Dentons US LLP

(57) ABSTRACT

A stripping composition that includes a dicarboxylic acid diester is described. The composition is useful and particularly efficient for stripping paint.

26 Claims, No Drawings

STRIPPING COMPOSITION

This application claims priority under 35 U.S.C. §119 of FR 09 0900296 filed Jan. 23, 2009, and is the United States national phase of PCT/EP2010/050696, filed Jan. 21, 2010, and designating the United States (published in the French language on Jul. 29, 2010, as WO 2010/084159 A1; the title and abstract were also published in French), each hereby expressly incorporated by reference in its entirety and each assigned to the assignee hereof.

A subject matter of the present invention is a stripping composition comprising a dicarboxylic acid diester. The composition is of use and particularly effective in stripping paints.

Stripping compositions are often used to strip coatings. Many compositions are toxic and/or dangerous to the user (for example irritating or inflammable) and/or to the environment (for example comprising volatile solvents) and/or are perceived as such.

Compositions presented as green, having a low impact on the environment and/or having a low toxicity and/or degree of danger, for example products sold under the Fluxaf Green and Syntilor names, are known.

Furthermore, compositions based on solvents perceived as toxic to the user and/or the environment, for example the products sold under the V33, Decapex and Oxistrip names, the labeling of which indicates a relatively high toxicity and/or degree of danger, are known.

There exists a need for novel stripping compositions which have a low impact on the environment and/or which have a low toxicity and/or degree of danger and which exhibit an improved effectiveness.

The invention meets this need by providing a stripping composition comprising:
a) at least 50% by weight, preferably at least 60% by weight, of a mixture of solvents comprising:
  a1) a dicarboxylic acid diester corresponding to the formula (I):

$$R^1\text{—OOC-A-COO—}R^2 \quad (I)$$

where
    the $R^1$ and $R^2$ groups, which are identical or different, represent a linear or branched, cyclic or noncyclic, $C_1$-$C_{20}$ alkyl, aryl, alkylaryl or arylalkyl group,
    the A group represents a linear or branched divalent alkylene group, and
  a2) at least one cosolvent other than an alcohol, the ratio by weight of a2) to a1) being comprised between $5/50$ and $30/70$,
b) at least one nonionic surfactant,
c) optionally an anionic surfactant,
d) optionally an acid,
e) optionally an activator, preferably an alcohol,
f) optionally water, and
g) optionally a thickener.

According to a preferred embodiment of the invention, the stripping composition comprises:
  at least 50% by weight, preferably between 50 and 90% by weight, of a dicarboxylic acid diester a1) corresponding to the formula (I) described above,
  from 5 to 45% by weight of at least one cosolvent a2) other than an alcohol,
  from 0.1 to 5% by weight of at least one nonionic surfactant b),
  from 0 to 15% by weight of compounds chosen from one or more of the following compounds:
c) an anionic surfactant,
d) an acid,
e) an activator,
f) water,
g) a thickener.

The invention also relates to the use of the composition to strip a coating present on a substrate. The invention also relates to a stripping process employing the composition, for example comprising a stage of application of the stripping composition to a substrate exhibiting a coating to be stripped off.

DEFINITIONS

In the present patent application, unless otherwise indicated, the amounts and/or ratios are given by weight.

In the present patent application, unless otherwise indicated, all the limits of values, upper and/or lower, indicate that the values are strictly less than or equal to the upper limit and/or are strictly greater than or equal to the lower limit. The terms "comprised between" and "from . . . to . . . " cover and disclose each of the limits individually, as well as the strictly lower values excluding the upper limit or the strictly greater values excluding the lower limit.

In the present patent application, unless otherwise indicated, the amounts of materials are considered as active material or dry matter.

a) Mixture of Solvents

In the present patent application, the term "mixture of solvents" is understood to mean both a physical mixture prepared beforehand (premix) and a combination starting from separate sources, the mixture then being obtained during the preparation of the composition by mixing the solvents and the other ingredients.

a1) Dicarboxylic Acid Diester

It is noted that, according to an alternative form of the invention, the dicarboxylic acid diester can be provided in the form of a mixture different dicarboxylic acid diesters of formula (I).

The $R^1$ and $R^2$ groups, which are identical or different, can be chosen in particular from the methyl, ethyl, n-propyl, isopropyl, benzyl, phenyl, n-butyl, isobutyl, cyclohexyl, hexyl, n-hexyl, isooctyl or 2-ethylhexyl groups. They correspond to the alcohols of formulae $R^1$—OH and $R^2$—OH, which are identical or different.

In the present patent application, this diester of a dicarboxylic acid of formula (I) may be denoted by "diester", "specific diester" or "diester used in the invention".

It is possible to use one or more specific diesters. In the patent application, unless the presence of at least two specific diesters is explicitly mentioned, "a" specific diester can denote a single diester corresponding to the formula (I) or a mixture or a combination of several specific diesters corresponding to the formula (I).

The A group is a divalent alkylene group. The corresponding acid is the compound of formula HOOC-A-COOH. By misuse of language, the A group can be denoted by the acid to which it corresponds.

According to an alternative form of the invention, A is a linear divalent alkylene group of formula $(CH_2)_r$, where r is a mean number comprised between 2 and 4 inclusive.

Preferably, A is chosen so that the diester can be a mixture of adipate diesters (r=4), of glutarate diesters (r=3) and of succinate diesters (r=2).

Advantageously, the diester used in the present invention is chosen from:
  dimethyl adipate, a mixture of dimethyl adipate (for example from 9 to 17% by weight, by Gas Chromatography), dimethyl glutarate (for example from 59 to 67% by weight) and dimethyl succinate (for example from 20 to 28% by weight), for example sold by Rhodia under the name Rhodiasolv® RPDE, diisobutyl adipate, a mixture of diisobutyl adipate (for example from 9 to 17% by weight, by Gas Chromatography), diisobutyl glutarate (for example from 59 to 67% by weight) and diisobutyl succinate (for example from 20 to 28% by weight), for example sold by Rhodia under the name Rhodiasolv® DIB.

According to another alternative form of the present invention, use is made of a diester of a dicarboxylic acid of formula (I) for which the A group is a branched divalent $C_3$-$C_{10}$ alkylene group. In the present patent application, this diester of a dicarboxylic acid may be denoted by "branched diester".

In the branched diester used in the invention, the A group can in particular be a $C_3$, $C_4$, $C_5$, $C_6$, $C_7$, $C_8$ or $C_9$ group or a mixture. It is preferably a $C_4$ group.

The A group is preferably chosen from the following groups:

the $AM_G$ group of formula —$CH(CH_3)$—$CH_2$—$CH_2$— (corresponding to 2-methylglutaric acid), the $A_{ES}$ group of formula —$CH(C_2H_5)$—$CH_2$— (corresponding to 2-ethylsuccinic acid), and their mixtures.

Advantageously, the branched diester is dimethyl 2-methylglutarate, corresponding to the following formula:

According to a preferred embodiment, the specific diester is provided in the form of a mixture comprising the diesters of dicarboxylic acids of following formulae (I'), (I") and optionally (II):

optionally $R^1$—OOC—$(CH_2)_4$—COO—$R^2$ (II) (diester of adipic acid), where:

$A_{MG}$ is a group of formula —$CH(CH_3)$—$CH_2$—$CH_2$—, $A_{ES}$ is a group of formula —$CH(C_2H_5)$—$CH_2$—.

In these formulae (I'), (I") and (II), the $R^1$ and $R^2$ groups can in particular be methyl, ethyl or isobutyl groups.

According to a particularly preferred embodiment of the present invention, the mixture of diesters comprises:

from 70 to 95% by weight of the dicarboxylic acid diester of formula (I'), preferably of the dimethyl ester, from 5 to 30% by weight of the dicarboxylic acid diester of formula (I"), preferably of the dimethyl ester, and from 0 to 10% by weight of the dicarboxylic acid diester of formula (II), preferably the dimethyl ester.

A mixture of diesters where the A group is branched is sold by Rhodia under the name Rhodiasolv® IRIS. Such mixtures and appropriate preparation processes are described in particular in the documents WO 2007/101929, WO 2007/141404, WO 2008/009792 and WO 2008/062058.

In yet another embodiment of the present invention, the diester used can be a mixture of linear diesters, for example Rhodiasolv® RPDE, and branched diesters, for example Rhodiasolv® IRIS.

The composition can, for example, comprise at least 50% by weight of the dicarboxylic acid diester, preferably between 50 and 90% by weight, more preferably still from 60 to 85% by weight and in particular from 60 to 80% by weight of the dicarboxylic acid diester.

a2) Cosolvent

The cosolvent can in particular be a polar solvent. It can in particular be a compound chosen from:

dimethyl sulfoxide, alkylene carbonates, preferably ethylene carbonate, ketones, preferably acetone, methyl ethyl ketone, cyclohexanone, γ-butyrolactone or butanone, dioxolanes, preferably 1-3-dioxolane or 4-methyl-1,3-dioxolan-2-one, N-alkylpyrrolidones, preferably N-methylpyrrolidone or N-ethylpyrrolidone, esters, preferably 3-ethylethoxy propionate (EEP) or 1-methoxy-2-propyl acetate or alkyl formates, such as ethyl formate, or alkyl acetates, such as butyl acetate or benzyl acetate, or methyl levilunate, phosphates or phosphonates, preferably trialkyl phosphates, such as triethyl phosphate, or dialkyl alkylphosphonates, such as dibutyl butylphosphonate, ethers, preferably glycol ethers, such as dipropylene glycol monoethyl ether or tripropylene glycol monoethyl ether, or anisole, and their mixtures or combinations.

Advantageously, the cosolvent is chosen from:

dimethyl sulfoxide, alkylene carbonates, preferably ethylene carbonate, ketones, preferably acetone, methyl ethyl ketone, cyclohexanone, γ-butyrolactone or butanone, dioxolanes, preferably 1,3-dioxolane or 4-methyl-1,3-dioxolan-2-one, esters, preferably 3-ethylethoxy propionate (EEP) or 1-methoxy-2-propyl acetate or alkyl formates, such as ethyl formate, or alkyl acetates, such as butyl acetate or benzyl acetate, or methyl levilunate, phosphates or phosphonates, preferably trialkyl phosphates, such as triethyl phosphate, or dialkyl alkylphosphonates, such as dibutyl butylphosphonate, ethers, preferably glycol ethers, such as dipropylene glycol monoethyl ether or tripropylene glycol monoethyl ether, or anisole, and their mixtures or combinations.

According to a particularly preferred embodiment of the invention, the cosolvent is chosen from:

dimethyl sulfoxide, alkylene carbonates, preferably ethylene carbonate, dioxolanes, preferably 1,3-dioxolane or 4-methyl-1,3-dioxolan-2-one, esters, preferably 3-ethylethoxy propionate (EEP) or 1-methoxy-2-propyl acetate, ethers, preferably glycol ethers, such as dipropylene glycol monoethyl ether or tripropylene glycol monoethyl ether, and their mixtures or combinations.

It is noted that it is not ruled out for a cosolvent to belong to several of the categories mentioned above.

Advantageously, the diester can be combined with dimethyl sulfoxide, an ester, an ether or an alkylene carbonate; preferably, the diester is combined with dimethyl sulfoxide or 3-ethylethoxy propionate (EEP). Advantageously, a diester of formula (I) where A is branched can be combined with dimethyl sulfoxide, an ester, a glycol ether or an alkylene carbonate; preferably, the branched diester is combined with dimethyl sulfoxide or 3-ethylethoxy propionate (EEP).

The composition can, for example, comprise from 5 to 45% by weight, preferably from 5 to 30% by weight, of cosolvent.

According to one embodiment, the mixture of solvents does not comprise large amounts (less than 5% by weight, preferably less than 2.5% by weight, preferably less than 1% by weight, preferably none at all) of solvents of aliphatic and/or aromatic hydrocarbon type, such as hydrocarbon fractions and/or paraffin solvents (for example, white spirit or the products of the Isopar® or Solvesso® ranges from Exxon or the Soltrol® range from Shell).

b) Nonionic Surfactant

According to one embodiment, the composition does not comprise nonionic surfactant other than polyalkoxylated terpene. Advantageously, said polyalkoxylated terpene nonionic surfactant is a polyethoxylated and/or polyproxylated terpene, preferably a polyethoxylated and polypropxylated terpene, the ethoxy and propoxy units being distributed randomly or blockwise.

The polyalkoxylated terpene can correspond to the following formula (III):

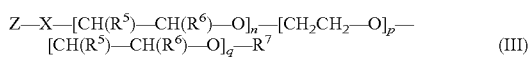

(III)

in which formula:

Z represents a bicyclo[a.b.c]heptenyl or bicyclo[a.b.c]heptyl radical, with a+b+c=5
a=2, 3 or 4
b=2 or 1
c=0 or 1
said radical optionally being substituted by at least one $C_1$-$C_6$ alkyl radical and comprising a Z backbone chosen from those indicated below or with the corresponding backbones devoid of a double bond:

a)

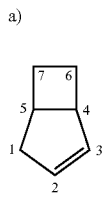

[3.2.0]

b)

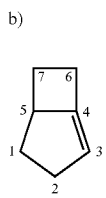

[3.2.0]

c)

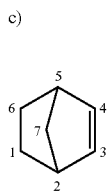

[2.2.1]

d)

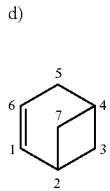

[3.1.1]

e)

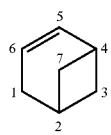

[3.1.1]

f)

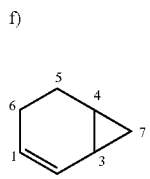

[4.1.0]

g)

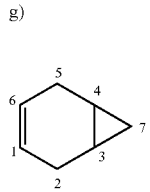

[4.1.0]

X represents —$CH_2$—$C(R^3)(R^4)$—O— or —O—$CH(R'^3)$—$CH(R'^4)$—O—, in which:

$R^3$, $R^4$, $R'^3$ and $R'^4$, which are identical or different, represent hydrogen or a saturated or unsaturated and linear, branched or cyclic $C_1$-$C_{22}$, preferably $C_1$-$C_6$, hydrocarbon radical;

$R^5$ and $R^6$, which are identical or different, represent hydrogen or a saturated or unsaturated and linear, branched or cyclic $C_1$-$C_{22}$ hydrocarbon radical, with the condition that at least one of the $R^5$ and $R^6$ radicals is other than hydrogen;

$R^7$ represents hydrogen or a saturated or unsaturated, linear, branched or cyclic, aromatic or nonaromatic, $C_1$-$C_{22}$ hydrocarbon radical which is optionally substituted (for example by an OH group);

n, p and q are integers or nonintegers greater than or equal to 0, n+p+pq>1, preferably from 2 to 200, preferably from 5 to 50.
Preferably, n, p and q are chosen so that:
  n is an integer or noninteger comprised between 2 and 10 inclusive;
  p is an integer or noninteger comprised between 3 and 20 inclusive;
  q is an integer or noninteger comprised between 0 and 30 inclusive.

Nonionic surfactants of polyalkoxylated terpene type are, for example, sold by Rhodia under the name Rhodoclean®. Use may be made, for example, of the product Rhodoclean® MSC.

The use of surfactants of polyoxylated terpene type, acting synergistically with the diester, makes it possible to improve the efficiency of the diester for the stripping.

Compounds of a first type are defined by the formula (III) in which X is equal to —$CH_2$—$C(R^3)(R^4)$—O—.

Thus, this compound, hereinafter compound (IIIa), corresponds to the following formula: Z—$CH_2$—$C(R^3)(R^4)$—O—[$CH(R^5)$—$CH(R^6)$—O]$_n$—[$CH_2CH_2$—O]$_p$—[$CH(R^5)$—$CH(R^6)$—O]$_q$—$R^7$, in which formula Z, $R^3$, $R^4$, $R^5$, $R^6$, $R^7$, n, p and q have the general meanings indicated above.

Preferably, the Z radical is chosen from the radicals of formulae c) to g).

It should be noted that the Z radical is more particularly attached to the remainder of the chain via any one of the carbon atoms 1 to 6, the carbon atoms 1, 5 and 6 being preferred.

Furthermore, the Z radical can be substituted on at least one of its carbon atoms by two $C_1$-$C_6$ alkyl radicals, preferably two methyl radicals.

More particularly, the carbon 7 is substituted by these two alkyl radicals, more specifically two methyls.

One of the preferred compounds used in the present invention is thus composed of a compound, the Z radical of which corresponds to one of those appearing in figures c) to g) and more preferably the radicals d) and e), the Z radical being substituted by two methyl radicals located on the carbon 7.

Particularly preferably, the Z radical corresponds to the formula d) or e), attached to the remainder of the chain via the carbon 5 or 1 and carrying two methyl substituents on the carbon 7.

Preferably, $R^3$ and $R^4$, which are identical or different, represent a hydrogen or a methyl radical. Preferably, $R^3$ and $R^4$ represent a hydrogen atom.

As was indicated above, the $R^5$ and $R^6$ radicals, which are identical or different, represent hydrogen or a saturated or unsaturated and linear, branched or cyclic $C_1$-$C_{22}$ hydrocarbon radical, with the condition that at least one of the $R^5$ and $R^6$ radicals is other than hydrogen.

More particularly, said radicals represent hydrogen or a $C_1$-$C_6$ alkyl radical, preferably the methyl radical or the ethyl radical, with the condition that at least one of these two radicals is other than hydrogen. Preferably, one of the radicals represents hydrogen and the other represents a methyl radical.

$R^7$ represents hydrogen or a saturated or unsaturated, linear, branched or cyclic, aromatic or nonaromatic, $C_1$-$C_{22}$ hydrocarbon radical which is optionally substituted, for example by an OH group.

In the case where $R^7$ is a hydrocarbon radical, the latter is more particularly a $C_1$-$C_6$ alkyl radical or an alkylphenyl radical which is optionally substituted by a halogen (such as chlorine, for example).

Preferably, $R^7$ is a hydrogen atom.

According to a specific embodiment of the present invention, the value of n is 3.

In addition, the value of p is more particularly comprised between 6.2 and 7, limits included. Preferably, p is comprised between 6.3 and 7, limits included.

According to another specific embodiment of the invention, n is comprised between 4 and 5, limits included.

Furthermore, the value of p is preferably comprised between 7 inclusive and 10 exclusive, preferably between 8 inclusive and 10 exclusive.

Preferably, q is equal to 0. If q is other than 0, then q is preferably comprised between 5 and 25, limits included.

Compounds of a second type are defined by the formula (III) in which X represents —O—CH($R'^3$)—CH($R'^4$)—O—.

Thus, this compound, hereinafter compound (IIIb), corresponds to the following formula: Z—O—CH($R'^3$)—CH($R'^4$)—O—[CH($R^5$)—CH($R^6$)—O]$_n$—[CH$_2$CH$_2$—O]$_p$—[CH($R^5$)—CH($R^6$)—O]$_q$—$R^7$, in which formula Z, $R'^3$, $R'^4$, $R^5$, $R^6$, $R^7$, n, p and q have the general meanings indicated above.

According to a preferred embodiment of the invention, the Z radical corresponds to the radical c), the bicyclic compound not comprising a double bond.

Here again, it should be noted that the Z radical is more particularly attached to the remainder of the chain via any one of the carbons 1 to 6. The carbon atoms 1, 3, 4 and 6 are more particularly selected.

Furthermore, the Z radical can be substituted on at least one of its carbon atoms by two $C_1$-$C_6$ alkyl radicals, preferably two methyl radicals.

More particularly, the carbon 7 is substituted by these two alkyl radicals, more specifically two methyls.

Furthermore, the Z radical carries, on one of the carbon atoms 2 and 5, a $C_1$-$C_6$ alkyl substituent, preferably a methyl radical.

More particularly, and as mentioned above, the $R'^3$ and $R'^4$ radicals, which are identical or different, represent hydrogen or a saturated or unsaturated and linear, branched or cyclic $C_1$-$C_{22}$ hydrocarbon radical, with the condition that one of the two is other than hydrogen.

According to a specific embodiment of the invention, said radicals represent hydrogen or a $C_1$-$C_6$ alkyl radical, preferably the methyl radical.

That which is indicated in connection with the $R^5$, $R^6$ and $R^7$ radicals, and also in connection with the values of n, p and q and in connection with the preferred alternative forms related to these values, remains valid and will not be taken up again here.

According to one embodiment, the composition does not comprise a surfactant other than the polyalkoxylated terpene and an optional optionally polyalkoxylated phosphate ester. According to a specific embodiment, the composition according to the invention does not comprise polyalkoxylated fatty alcohols, such as polyethoxylated and/or polypropoxylated fatty alcohols. According to a specific embodiment, the composition according to the invention does not comprise polyalkoxylated alkylphenols, such as polyethoxylated and/or polypropoxylated nonyl- or octylphenols, if appropriate terminated by an ethyl or methyl unit.

According to another embodiment of the invention, the nonionic surfactant can be chosen from sorbitan esters, alkoxylated castor oils, preferably ethoxylated castor oils (for example sold under the name Alkalmus® 696D), alkoxylated fatty amines, preferably ethoxylated fatty amines (for example sold under the name Rhodameen® PN 430), alkoxylated tristyrylphenols, preferably ethoxylated tristyrylphenols (for example sold under the name Soprophor® CY8), or their mixtures.

The composition can, for example, comprise from 0.1 to 5% by weight, preferably from 0.1 to 2% by weight, of the nonionic surfactant.

c) Anionic Surfactant

The composition can optionally comprise an anionic surfactant. It can in particular be a surfactant of sulfate, sulfonate, succinate, carboxylate, phosphate or phosphonate type. Such surfactants can in particular prevent the corrosion of the metal substrates treated (in particular the phosphates and phosphonate) and/or can contribute to improving the efficiency. The composition can, for example, comprise from 0.5 to 5% of anionic surfactant.

Use may in particular be made of an optionally polyalkoxylated phosphate ester, in or not in the salified form. Phosphate esters which can be used are in particular those with the following formula:

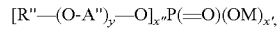

where,
M is chosen from a proton, a cation or a mixture, for example H$^+$, K$^+$ or Na$^+$,
x' and x" are equal to 1 or 2, with the condition that the sum of x' and x" is equal to 3,
y, which is a mean value, is comprised between 0 and 100, preferably between 1 and 15,
the R" groups, which are identical or different, represent a hydrocarbon radical comprising from 1 to 35 carbon atoms, and the A" groups, which are identical or different, represent a linear or branched alkylene radical, comprising from 2 to 4 carbon atoms.

The R" groups, which are identical or different, represent a $C_1$-$C_{35}$, preferably $C_5$-$C_{20}$, alkyl, alkylaryl, polyalkylaryl or (polyarylalkyl)aryl group (it being possible for the alkyl groups to be saturated or unsaturated and linear or branched). As regards the polyalkoxylated compounds, they can be polyethoxylated compounds. The degree of alkoxylation can in particular be comprised between 0 and 100, preferably between 1 and 15.

More particularly, the R" groups are linear or branched alkyl or alkenyl radicals carrying one or more ethylenic unsaturations and comprising from 8 to 26 carbon atoms. Mention may in particular be made, as examples of such radicals, of the stearyl, oleyl, linoleyl and linolenyl radicals. In addition, the R" radicals, which are identical or different, can be aromatic radicals carrying alkyl, arylalkyl or alkylaryl substituents, these radicals comprising from 6 to 30 carbon atoms. Mention may be made, as examples of such radicals, inter alia, of the nonylphenyl and mono-, di- and tristyrylphenyl radicals.

More particularly, the (O-A") groups, which are identical or different, correspond to an oxyethylene, oxypropylene or oxybutylene radical or their mixtures. Preferably, said group corresponds to an oxyethylene and/or oxypropylene radical.

Surfactants of phosphate ester type which are of use are sold in particular by Rhodia under the Lubrhophos® and Rhodafac® names. Mention is made in particular of the product Rhodafac® RA600.

d) Acid

The composition can in particular comprise an acid. Without wishing to be committed to any one theory, it is believed that such a compound can in particular help in breaking the polymer chains of the coating to be stripped off. The acid is preferably an organic acid. Such compounds are in particular preferred for reasons of harmfulness and/or safety and/or for reasons of stability of the diester (resistance to hydrolysis). The composition can in particular comprise from 1 to 5% by weight of acid. For the same reasons as those set out with regard to the nature of the acid, it is preferable to employ moderate amounts.

Mention is in particular made, as acids which can be used, of aliphatic carboxylic acids, such as formic acid or acetic acid or oxalic acid or lactic acid.

e) Activator

The activator is a molecule, generally small in size, which can open the polymer chains of the coating to be stripped off. All known and/or normally used activators can be used. It can in particular be an alcohol. Mention is in particular made of methanol, ethanol and isopropanol. The composition can in particular comprise from 0.1 to 5% of activator, preferably of alcohol.

f) Water

The presence of water may be intentional: the water can contribute to activation of the stripping. The presence of water may also be enforced, as impurity or byproduct of the ingredients of the composition or as medium for diluting the ingredients. The composition preferably comprises at most 10% by weight of water, preferably at most 5% by weight of water. If it comprises water, the amount of water can, for example, be greater than or equal to 0.1% by weight.

p) Thickener

The viscosity of the composition can be regulated using a thickener. The desired viscosity can depend on the method of application (the method of application can depend on the viscosity of the composition). By way of indication, if a thickener is used, it can be present in an amount ranging from 0.1 to 5% by weight.

All thickeners known and/or normally used can be used. They can, for example, be cellulose derivatives (ethylcellulose, hydroxypropylcellulose), xanthan gums or derivatives, guar gums or derivatives, such as hydroxypropyl guar gums, locust bean gum or derivatives, alginates or derivatives, polyacrylates, or starches or derivatives. Use may in particular be made of cellulose ethers, for example the product sold under the name Methocel™ 311 by Dow.

Specific Characteristics

According to a preferred embodiment of the invention, the stripping composition comprises:

from 60 to 85% by weight of a dicarboxylic acid diester a1) corresponding to the formula (I) described above, from 5 to 30% by weight of at least one cosolvent a2) other than an alcohol, from 0.1 to 5% by weight of at least one nonionic surfactant b), from 0 to 10% by weight of compounds chosen from one or more of the following compounds:

c) an anionic surfactant,
d) an acid,
e) an activator,
f) water,
g) a thickener.

According to a particularly useful and/or effective embodiment, the stripping composition comprises:

a1) from 60 to 80% by weight of the dicarboxylic acid diester, a2) from 5 to 30% by weight of cosolvent chosen from dimethyl sulfoxide, glycol ethers, esters and alkylene carbonates, preferably dimethyl sulfoxide or 3-ethylethoxy propionate (EEP), b) from 0.1 to 2% by weight of the polyalkoxylated terpene surfactant, c) from 0.5 to 5% by weight of polyalkoxylated phosphate ester surfactant, in or not in the salified form, d) from 1 to 5% by weight of acid, preferably organic acid, such as formic or acetic or oxalic or lactic acid, e) from 0.1 to 5% by weight of methanol, f) from 0 to 10% by weight of water.

Process for the Preparation of the Composition

The composition can be prepared by any appropriate process involving the mixing of the various ingredients. According to a specific embodiment, premixes of some ingredients can be employed. Premixes can in particular be commercially available products. Use may in particular be made of ready-for-use premixes for introduction into compositions or blends of the diester and of the cosolvent, of the diester and of the nonionic surfactant, in particular of the polyalkoxylated terpene, or of the diester, of the cosolvent and of the nonionic surfactant, in particular of the polyalkoxylated terpene.

Use of the Stripping Composition

The stripping composition can be conventionally used to strip a coating present on a substrate.

The coating is typically a paint, preferably an acrylic, alkyd, glycero, epoxy, polyurethane or polyester paint, in aqueous or nonaqueous solvent (nonaqueous solvent, referred to as organic solvent). It can be a varnish or a lacquer.

The substrate can in particular be a substrate made of metal, wood, ceramic or plastic (it can be a resin or a composite or a thermoplastic). The material of the substrate is categorized as the material of the surface on which the coating to be stripped off is present. If the substrate is a multilayer structure, it is thus considered that the material of the substrate is the layer touching the coating to be stripped off.

The substrate can in particular be a building surface (a wall, a ceiling or a floor, for example), a manufactured item or component, a piece of furniture, a fence, railings, a shutter, a door, the body of a vehicle, such as a train, a truck, an automobile or an airplane, or a boat hull. The substrate (and thus the coating) can be one intended to be internal or external and thus subject to bad weather, pollution and/or the sun.

During the use of the stripping composition, the operation is typically carried out by bringing the composition into contact with the coated substrate. The contacting operation can be carried out by any conventional means, in particular by dipping, spraying or applying as a layer (for example using a brush or a roller). After an appropriate acting time (which can depend on the method of application and/or on the amount applied and/or on the nature of the coating and/or on its thickness), the stripped coating can be removed. It is possible in particular to operate by mechanical action and/or by rinsing, for example with water. It is noted that the rinsing is typically a detergent-free rinsing. The mechanical action can, for example, be carried out by the action of a jet or of an object or tool of spatula type. It is noted that the composition can be recovered after the stripping and/or reused, if appropriate after filtration and/or purification operations. The composition can thus be at least partially recycled. It is noted that the stripping can be carried out by a manufacturer of the substrate (manufacturer and vendor of the manufactured products), by the owner or the user of the substrate (for example a consumer) or a person operating a stripping service. The stripping service can be operated on site or in a treatment center after transportation of the substrate to be stripped.

Other details or advantages of the invention may become apparent in the light of the following examples.

In the examples, the letter C indicates a comparative example.

EXAMPLE 1

Stripping Compositions

The following compositions are produced by mixing (the amounts are shown as weight of active material).

|  | Example 1.1 | Example 1.2 | Example 1.3 | Example 1.4C |
|---|---|---|---|---|
| Rhodiasolv ® IRIS, Rhodia | 71.1% | 81.1% | / | 99% |
| Rhodiasolv ® RPDE, Rhodia | / | / | 71.1% | / |
| DMSO | 20% | / | 20% | / |
| Ethylene carbonate | / | 10% | / | / |
| Formic acid | 3.5% | 3.5% | 3.5% | / |
| Methanol | 1% | 1% | 1% | / |
| Rhodafac ® RA600, Rhodia | 1.4% | 1.4% | 1.4% | / |
| Rhodoclean ® MSC | 1% | 1% | 1% | / |
| Methocel ® 311, Dow | 1% | 1% | 1% | 1% |
| Water | s.q.f | s.q.f | s.q.f | / |

EXAMPLE 2

Stripping Test on a Metal Substrate

A stripping test is carried out with different stripping compositions on test specimens coated with the following paint (alkyd type in a solvent phase): Blanc brillant [Glossy white], of the Tollens brand).

The paint is applied, using a film drawer, to a steel test specimen (of 14 cm×2.5 cm in size, from Q-Panel), so as to form a homogeneous paint film with a thickness of 80 μm.

A significant amount of the stripping composition is applied to the surface of the paints using a size 20 brush for acrylic paint. The stopwatch is started when the stripping composition has finished being applied. The stripping time corresponds to the time at which 90% of the paint has been completely detached from the metal substrate. This time characterizes the effectiveness of the stripping composition: the shorter this time, the more effective the stripping composition.

The results are presented in the following tables.

|  | Example 2.1 | Example 2.2 | Example 2.3 | Example 2.4C | Example 2.5C |
|---|---|---|---|---|---|
| Stripping composition | Example 1.1 | Example 1.2 | Example 1.3 | Example 1.4 | "Fluxaf Green"[1] |
| Time (min) | 5 min | Between 1 h and 2 h | 15 min | Greater than 5 h | 17 min |

[1] Commercially available stripping composition, Vliegenthart

|  | Example 2.6C | Example 2.7C | Example 2.8C | Example 2.9C |
|---|---|---|---|---|
| Stripping composition | "Aquarethane"[2] | "V33"[3] | "Decapex"[4] | "Oxystrip GelB"[5] |
| Time (min) | 17 min | 5 min | 5 min | 5 min |

[2] Commercially available stripping composition, Syntilor-Blanchon
[3] Commercially available stripping composition, V33 Group
[4] Commercially available stripping composition, Dyrup
[5] Commercially available stripping composition, Scheidel The above results show that the stripping composition 1.1 of the present invention is more effective than the compositions presented as green of comparative examples 2.5C and 2.6C and as effective as the aggressive compositions of comparative examples 2.7C to 2.9C.

It is also found that the composition 1.3 of the present invention is also effective, to an extent similar to the compositions of comparative examples 2.5C and 2.6C.

In addition, it emerges from the above tests that Rhodiasolv® IRIS is preferred to Rhodiasolv® RPDE and that the cosolvent DMSO is preferred to ethylene carbonate.

EXAMPLE 3

Stripping Compositions

The following compositions are prepared by mixing (the amounts are shown as weight of active material).

|  | Example 3.1 | Example 3.2 | Example 3.3 | Example 3.4 |
|---|---|---|---|---|
| Rhodiasolv ® IRIS, Rhodia | 71.1% | 71.1% | 71.1% | 71.1% |
| DMSO | 20% | 20% | 20% | 20% |
| Lactic acid | 3.5% | 3.5% | 3.5% | 3.5% |
| Methanol | 1% | 1% | 1% | 1% |
| Rhodoclean ® MSC | 1% | — | — | — |
| Soprophor ® CY8 | — | 1% | — | — |
| Alkamuls ® 696D | — | — | 1% | — |
| Rhodameen ® PN430 | — | — | — | 1% |
| Water | s.q.f | s.q.f | s.q.f | s.q.f |

EXAMPLE 4

Stripping Test on a Metal Substrate

A stripping test is carried out with different stripping compositions 3.1 to 3.4 on test specimens coated with the following paint (alkyd type in a solvent phase): Blanc brillant [Glossy white], of the Tollens brand).

The paint is applied, using a film drawer, to a steel test specimen (of 14 cm×2.5 cm in size, from Q-Panel, so as to form a homogeneous paint film with a thickness of 80 μm.

A significant amount of the stripping composition is applied to the surface of the paints using a size 20 brush for acrylic paint. The stopwatch is started when the stripping composition has finished being applied. The order in which the compositions manage to strip 90% of the paint from the metal substrate is looked at. This classification characterizes the effectiveness of the stripping composition: the first composition is the most effective.

The results are presented in the following table.

|  | Example 4.1 | Example 4.2 | Example 4.3 | Example 4.4 |
|---|---|---|---|---|
| Stripping composition | Ex. 3.1 (Rhodoclean® MSC) | Ex. 3.2 (Soprophor® CY8) | Ex. 3.3 (Alkalmus® 696D) | Ex. 3.4 (Rhodameen® PN430) |
| Stripping order | 1st | 2nd | 3rd | 4th |

All the compositions 3.1 to 3.4 exhibit good stripping properties, the nonionic surfactant Rhodoclean® MSC being the most effective in terms of speed of stripping.

What is claimed is:

1. A stripping composition comprising:
   a1) a dicarboxylic acid diester corresponding to the formula (I):

$R^1$—OOC-A-COO—$R^2$ (I)

wherein
   the $R^1$ and $R^2$ groups, which are identical or different, represent a linear or branched, cyclic or noncyclic, $C_1$-$C_{20}$ alkyl, aryl, alkylaryl or arylakyl group wherein A is branched and is selected from the group consisting of the $A_{MG}$ group of formula —CH($CH_3$)—$CH_2$—$CH_2$, the $A_{ES}$ group of formula —CH($C_2H_5$)—$CH_2$— and their mixtures, and
   a2) at least one cosolvent other than an alcohol, wherein the cosolvent is selected from the group consisting of a dimethyl sulfoxide, a ketone, an ester, and mixtures thereof,
   wherein the ester is 3-ethylethoxy propionate (EEP), 1-methoxy-2-propy acetate, benzyl acetate, an alkyl acetate, or methyl levilunate,
   the ratio by weight of a2) to a1) being comprised between 5/50 and 30170,
   b) at least one nonionic surfactant, wherein the nonionic surfactant is selected from the group consisting of a polyalkoxylated terpene, a sorbitan ester, an alkoxylated castor oil, an alkoxylated fatty amine, an alkoxylated tristyrylphenol and mixtures thereof,
   c) optionally an anionic surfactant,
   d) optionally an acid,
   e) optionally an activator,
   f) optionally water, and
   g) optionally a thickener; and wherein the composition comprises:
   from 60% to 65% by weight of the dicarboxylic acid diester,
   from 5% to 30% by weight of the cosolvent and
   from 0.1% to 5% by weight of the nonionic surfactant;
   wherein the resulting stripping composition can strip acrylic paint from a surface of a metal substrate at a rate faster than a stripping composition wherein A is linear.

2. The stripping composition as claimed in claim 1, wherein the composition comprises:
   a1) the dicarboxylic acid diester,
   a2) the at least one cosolvent,
   b) the at least one nonionic surfactant,
   c) an anionic surfactant,
   d) an acid,
   e) an activator
   f) water, and
   g) a thickener.

3. The composition as claimed in claim wherein R1 and R2 are methyl groups.

4. The composition as claimed in claim 1, wherein the anionic surfactant is an optionally polyalkoxylated phosphate ester, in or not in a salified form.

5. The composition as claimed in claim 1, wherein the composition comprises from 0.5% to 5% by weight of an anionic surfactant.

6. The composition as claimed in claim 1, wherein the acid is an organic add.

7. The composition as claimed in claim 1, wherein the composition comprises from 1% to 5% by weight of acid.

8. The composition as claimed in claim 1, wherein the activator is selected from the group consisting of methanol, ethanol and isopropanol.

9. The composition as claimed in claim 1, wherein the composition comprises from 0.1% to 5% by weight of alcohol.

10. The composition as claimed in claim 1, wherein the composition comprises at most 10% by weight of water.

11. The composition as claimed in claim 1, wherein the composition comprises:
    a1) from 60% to 80% by weight of the dicarboxylic acid diester,
    a2) from 5% to 30% by weight of cosolvent selected from the group consisting of dimethyl sulfoxide, and an ester,
    b) from 0.1% to 2% by weight of the polyalkoxylated terpene surfactant,
    c) from 0.5% to 5% by weight of polyalkoxylated phosphate ester surfactant, in or not in a salified form,
    d) from 1% to 5% by weight of acid,
    e) from 0.1% to 5% by weight of methanol, and
    f) from 0% to 10% by weight of water.

12. A method of stripping a coating present on a substrate, the method comprising applying the composition as claimed in claim 1 to the coating present on the substrate to strip the coating from the substrate.

13. The method as claimed in claim 12, wherein the coating is a paint.

14. The composition as claimed in claim 1, wherein the composition comprises 60% to 80% of the dicarboxylic acid diester.

15. The composition as claimed in claim 1, wherein the ketone is selected from the group consisting of acetone, methyl ethyl ketone, cyclohexanone, γ-butyrolactone and butanone.

16. The composition as claimed in claim 1, wherein the ester is 3 ethylethoxy propionate (EEP), 1-methoxy-2-propyl acetate, butyl acetate, benzyl acetate, or methyl levilunate.

17. The composition as claimed in claim 16, wherein the ester is butyl acetate or benzyl acetate.

18. The composition as claimed in claim 1, wherein the alkoxylated castor oil is an ethoxylated castor oil.

19. The composition as claimed in claim 1, wherein the alkoxylated fatty amine is an ethoxylated fatty amine.

20. The composition as claimed in claim 1, wherein the alkoxylated tristyrylphenol is an ethoxylated tristyrylphenol.

21. The composition as claimed in claim 1, wherein the composition comprises 0.1% to 2% by weight of the nonionic surfactant.

22. The composition as claimed in claim 6, wherein the organic acid is formic acid, acetic acid, oxalic acid or lactic acid.

23. The composition as claimed in claim 10, wherein the composition comprises at most 5% by weight of water.

24. The composition as claimed in claim 11, wherein the cosolvent is dimethyl sulfoxide or 3-ethylethoxy propionate (EEP).

25. The composition as claimed in claim 11, wherein the acid is formic acid, acetic acid, oxalic acid, or lactic acid.

26. The composition as claimed in claim 1, wherein the stripping composition can strip acrylic paint from a surface of a metal substrate in less than half the time it takes a stripping composition wherein A is linear.

\* \* \* \* \*